(12) United States Patent
Hesser et al.

(10) Patent No.: US 8,305,567 B2
(45) Date of Patent: Nov. 6, 2012

(54) RAIL SENSING APPARATUS AND METHOD

(75) Inventors: Peter Hesser, Rheinland-Pfalz (DE); Joseph Forrest Noffsinger, Lees Summit, MO (US); Thomas Michael Shanahan, Lees Summit, MO (US)

(73) Assignee: Progress Rail Services Corp, Albertville, AL (US)

( * ) Notice: Subject to any disclaimer, the term of this patent is extended or adjusted under 35 U.S.C. 154(b) by 985 days.

(21) Appl. No.: 11/575,038

(22) PCT Filed: Sep. 12, 2005

(86) PCT No.: PCT/US2005/032491
§ 371 (c)(1), (2), (4) Date: Jun. 4, 2008

(87) PCT Pub. No.: WO2006/031774
PCT Pub. Date: Mar. 23, 2006

(65) Prior Publication Data
US 2008/0304065 A1    Dec. 11, 2008

Related U.S. Application Data

(60) Provisional application No. 60/609,053, filed on Sep. 11, 2004.

(51) Int. Cl.
*G01N 21/00* (2006.01)

(52) U.S. Cl. .................................................. 356/237.1
(58) Field of Classification Search ..................... None
See application file for complete search history.

(56) References Cited

U.S. PATENT DOCUMENTS
6,377,877 B1    4/2002   Doner

FOREIGN PATENT DOCUMENTS
| DE | 20112238 | 12/2002 |
|----|----------|---------|
| WO | WO 01/18487 A1 | 3/2001 |
| WO | WO 0198769 | 12/2001 |
| WO | WO 2004/005864 A1 | 1/2004 |

OTHER PUBLICATIONS

Mainline and Transit Train Impact Load Detector, Jun. 26, 2003, 19 pgs., 0750851, GE Transportation Systems GmbH & Co. KG, Germany.

*Primary Examiner* — Gregory J Toatley
*Assistant Examiner* — Amanda Merlino

(57) ABSTRACT

A rail sensing and analysis system utilizes a laser sensor 105, 107 to detect displacement of a rail 102, 104 resulting from loads imposed by a passing rail vehicle. Vertical and/or lateral displacements/loads may be sensed. Signatures in the resulting signals are indicative of useful information about the rail vehicle; such as wheel condition, bearing condition, truck condition, degree of bogie hunting, total load, load distribution, etc. The ratio of Lateral over Vertical force (L/V) may be used as an evaluation criterion.

24 Claims, 21 Drawing Sheets

Acquisition of Measuring Data

Evaluation Part 1

Evaluation Part 2

Sensitive over the entire frequency range from 0 Hz to several kHz
Example: Detection of a high-frequency gear defect

RAIL SENSING APPARATUS AND METHOD

CROSS-REFERENCE TO A RELATED APPLICATION

This application claims the benefit of U.S. Provisional Patent Application Ser. No. 60/609,053 filed Sep. 11, 2004, incorporated herein by reference.

BACKGROUND

The safe and reliable operation of a railroad system is dependent upon the integrity of the rolling mechanisms of the vehicles traveling over the rails. The wheel sets and bogies of train vehicles are routinely inspected to ensure that they are in proper operating order. Periodic inspections during maintenance intervals are effective for identifying failed and degrading components. However, the frequency of such inspections is not always adequate due to the nature of certain modes of degradation. For example, a wheel may develop a flat spot during operation due to the application of vehicle brakes causing the wheel to skid along the track. Once a flat spot, or some other defect, is created, there may be excessive vibration and other impacts and defects that leads to mechanical failures generated in the vehicle suspension system that leads to premature failure of other rolling stock and/or rail components. An improved system and method for inspecting rail vehicle rolling mechanisms is desired.

SUMMARY

The bogies and wheel sets of railway vehicles impart lateral forces to the rails, i.e. forces with a component normal to the running rails, in the plane of the running rails. The expected, intended origin of these forces is to guide and steer the bogie and the vehicle along the railway track, maintaining the vehicle on the track. The lateral forces are transmitted from the wheels to the track at the wheel-to-rail interface by contact pressure of the guiding flange on the wheel to the running gage side of the rails, and by static and/or dynamic frictional interface of the vehicle wheel tread onto the running surface of the rail.

Railway vehicles with bogies that steer with excess forces, with bogies that are not correctly dynamically damped and thus exhibit excess rail to rail hunting, or with wheel sets with locked brakes and other similar symptoms can result in excess wheel and rail wear and/or derailments of the vehicle. Certain defects of the railway vehicle can be detected through measurement and analysis of the lateral and/or vertical forces in the running rails as a vehicle passes over a test section of track. These detectable defects include: bogies with excessive steering forces, bogies with excess hunting (oscillating side to side motion); locked brakes, wheel flat spots, degraded wheel bearings, and any other vehicle defect that exhibits changes in lateral and/or vertical forces related to the defect.

A sensing element is described as consisting of a light emitting diode or laser diode at one end and a charge coupled photosensitive array on the other end of a flexible housing, with the two ends of the housing separately secured to a railway running rail. The array is oriented so that lateral and/or vertical distortion of the running rail, when imparted to the ends of the sensor housing, causes movement of the light beam from the light emitting diode or laser diode across the charge coupled array. The output signal taken from the charge coupled array is directed to and analyzed with a microcomputer, and the waveform signature characteristics resulting from the lateral forces imparted by passing railway vehicles is stored in a database along with measurement data of lateral forces for other vehicles. Statistical methods are used on the measurement data to identify forces beyond software selectable control limits, indicating a railway vehicle with high probability of a defect. The database may contain references with the measurement data for each passing vehicle to the relative axle count within the train and the relative vehicle position within the train. Specific registered car number data from an external system may optionally be input to the database to tag the vehicle data with the unique vehicle registration number.

The characteristic waveform signature of each vehicle's data may be analyzed using the microcomputer system to predict the probable type of defect and probable severity of defect. At the users' optional selection, the measurement data and/or analysis results may be transmitted to a maintenance planning system, used to activate an immediate alarm transmitted to the train driver, and/or used to transmit an alarm to another person or system. Alarms transmitted may be further identified into categories based on type and severity of probable defect for various levels of response actions and various levels of urgency. Data processing and alarms may occur near real time, or be processed post train passage.

The lateral and/or vertical force system may be calibrated by applying a known force to the running rails with a Gage Restraint Measurement System (GRMS) vehicle or with a calibrated hydraulic cylinder or similar system. Alternatively, the system may be calibrated by analyzing the distribution of force data a significant number of trains passing through the system, and/or from sample rail vehicles with known defects.

Certain railway industry derailments of longer vehicles that have been historically categorized to be of undetermined or exceptional cause by the industry are now believed to be related to an unusually high value of the ratio of Lateral over Vertical force (L/V ratio) at the wheel to rail interface. This lateral force measurement system provides a direct measurement of the L/V ratio when integrated with a vertical force measurement system or when used in combination with a separate vertical force measurement system.

DETAILED DESCRIPTION

A rail displacement measuring device may be used to obtain data indicative of the loads that a rail vehicle wheel exerts on the rail as the vehicle rolls past the measuring device. The data is then processed to extract information indicative of the health of the rolling mechanisms associated with the vehicle.

Figure 1:
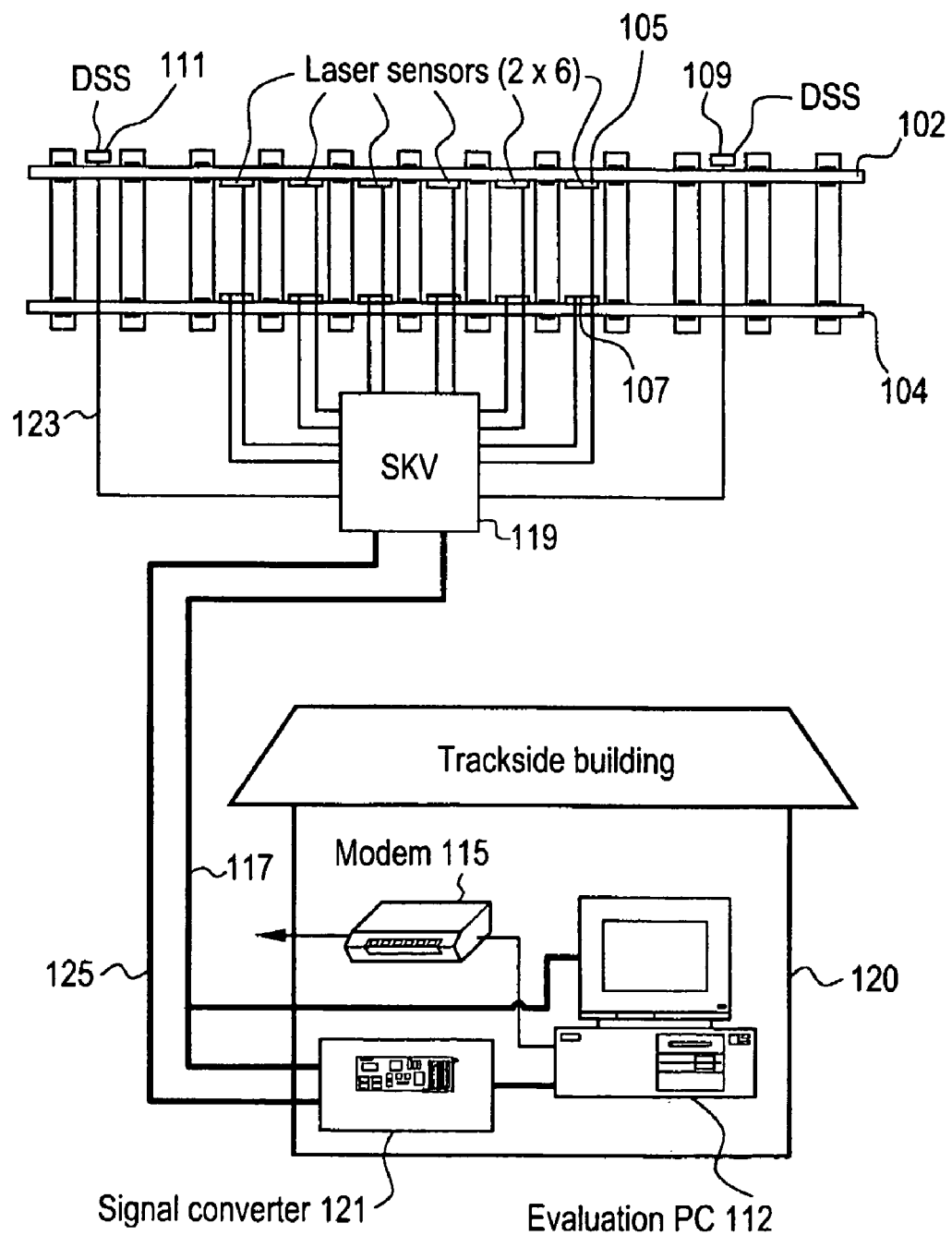
FIG. 1 is a schematic illustration of an exemplary rail sensing and analysis system.

FIG. 1 illustrates an exemplary rail sensing and analysis system. One or more sensors are placed in position along a track to obtain information from the rail(s) as a rail vehicle passes. In the embodiment of FIG. 1, six laser sensors 105, 107 are positioned along each of two parallel track rails, 102, 104. The laser sensors 105, 107 provide a signal responsive to deflection of the rails 102, 104, such as by the lateral and vertical forces exerted on the rails by the wheels of a passing rail vehicle. Laser detectors and deflection monitoring devices are described in published European patent documents WO 01/18487 A1 and WO 2004/005864 A1, incorporated by reference herein in their entireties. The laser sensors 105, 107 may be used to detect lateral and/or vertical deflection of the rails. Generally, the sensor(s) function to detect changes in the rail 102, 104 resulting from the passing vehicle. Wheel sensors 109, 111 positioned at both ends of the laser sensors 105, 107 trigger the actuation of the laser sensors 105, 107. The signal- and supply lines 117, 125 of the laser sensors 105, 107 are collected in the signal cable distributor 119 and continued to the signal converter 121 as well as to evaluation computer 112 in the distribution station 120. The wheel-sensors lines 123 are embedded in the distributor 119 and also lead to the signal converter 121. The signal converter 121 contains additionally the supply, with protective extra-low voltages, for the single sensors. Signals from the sensors are processed to extract useful information, as will be described more fully below, such as by software executed in a computer 112. The extracted information, the raw signals, or partially processed signals may be communicated to a remote location for further use, such as by the illustrated modem 115 or other communication device.

Figure 2:
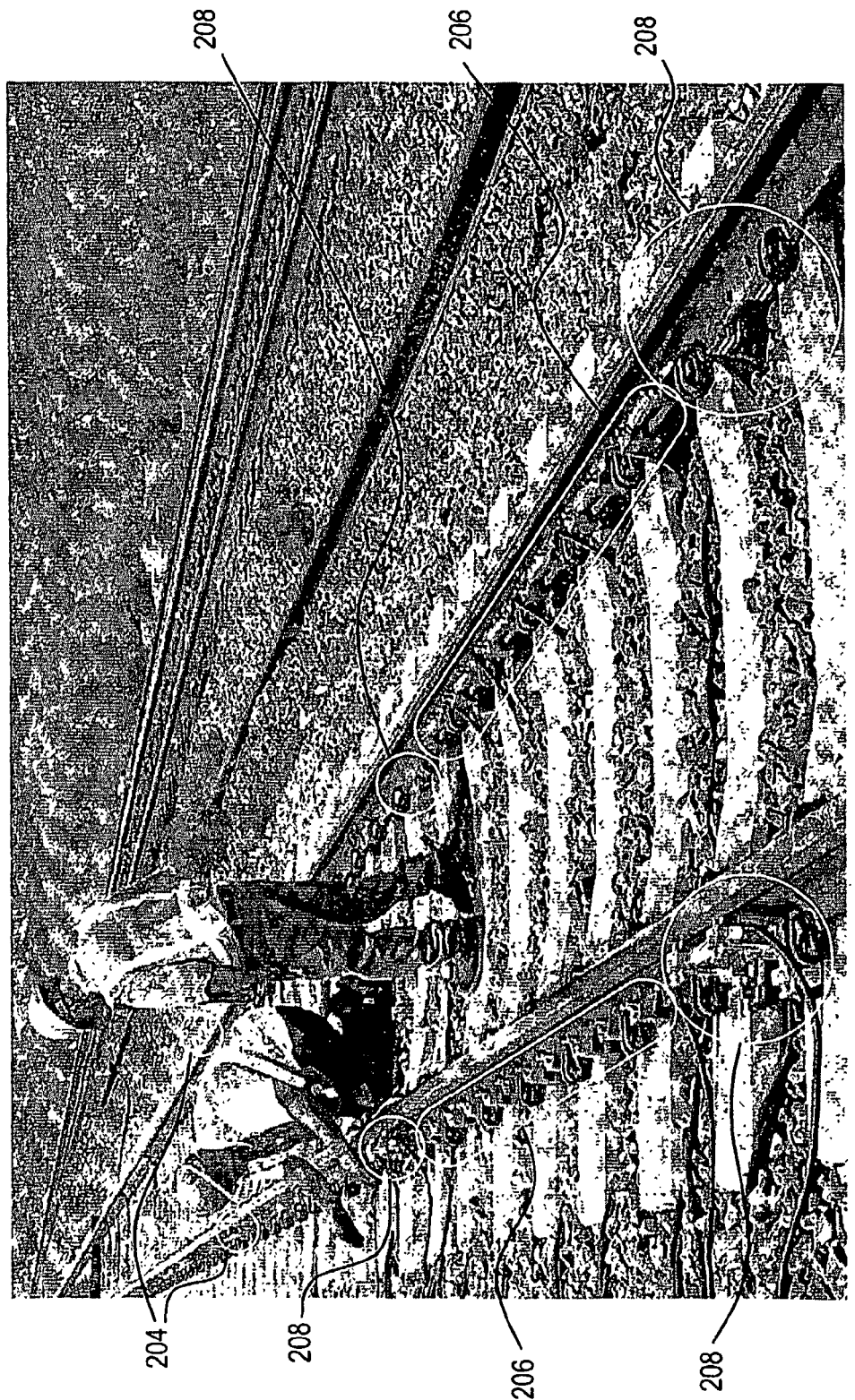
FIG. 2 is a picture of an exemplary rail sensor application.
Figure 4A:
FIG. 4 provides a photograph of a vertical sensor installation and a lateral sensor installation.
Figure 4B:
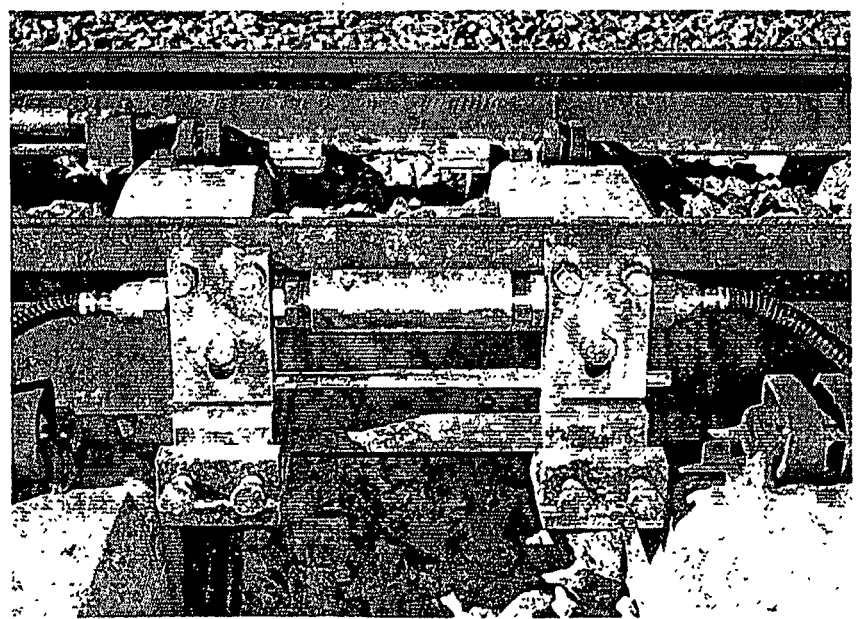

FIG. 2 is a picture of an actual rail-side sensor configuration 202 using wheel sensors 204, vertical laser sensors 206, and lateral laser sensors 208. One may appreciate that other types of rail sensors may be used together with the laser sensors in other embodiments, for example strain gauges, accelerometers, sonic and/or ultrasonic detectors, etc. FIGS. 4a-b represents close-up photographs of a vertical laser sensor (FIG. 4a) and a lateral laser sensor (FIG. 4b).

Figure 3:
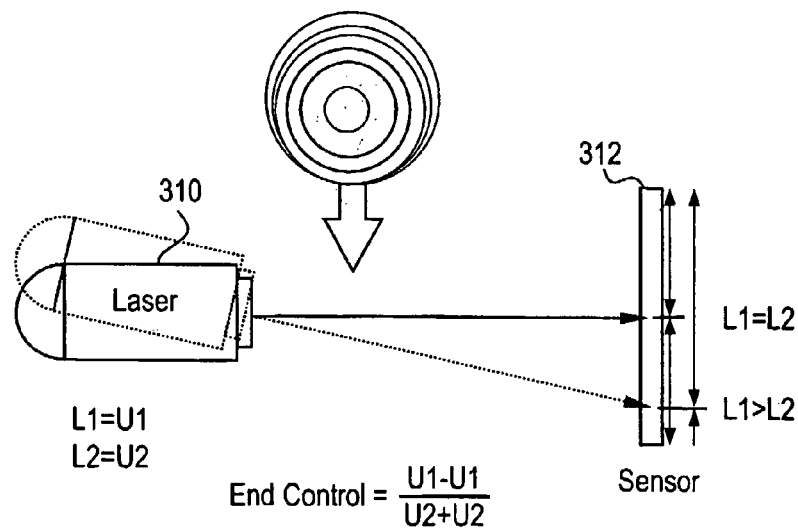
FIG. 3 illustrates the measuring principle incorporated into one embodiment of a rail force sensing system.

FIG. 3 illustrates the measuring principle for detecting rail deflection using a laser sensor. A light source such as a light emitting diode or laser diode 310 directs a beam of light toward a sensor (or detector) 312 such as a charge coupled photosensitive array disposed at an opposed end of a flexible housing, with the two ends of the housing separately secured to a rail. The array is oriented so that local distortion of the rail causes perceived relative movement of the point of impingement of the light beam onto the sensor. When no force is acting on the rail, the image of the laser beam is located in the center of the sensor surface. Partial currents (I1 and I2) corresponding to the deviations L1 and L2 are transmitted, however, they are indicated as partial voltages (U1 and U2).

Figure 5:
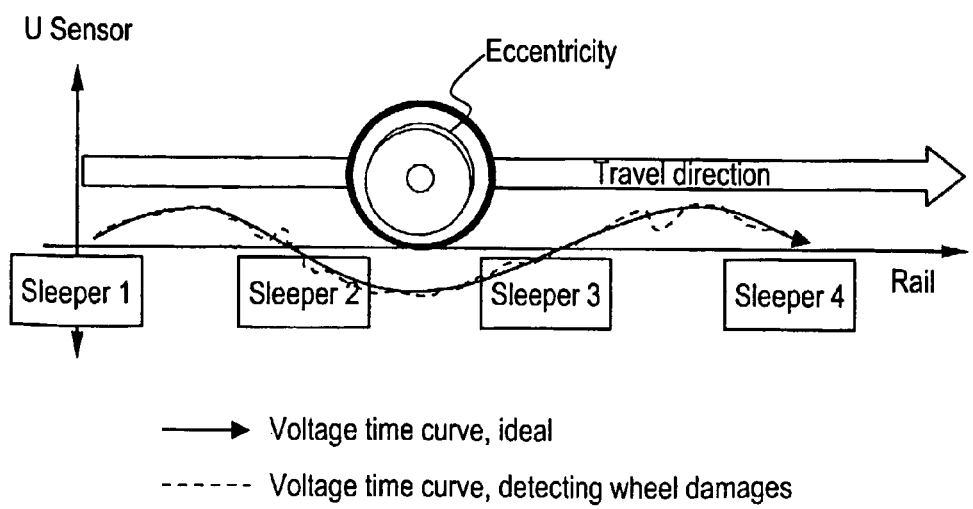
FIG. 5 illustrates a sensor voltage curve resulting from rail deflections.
Figure 6:
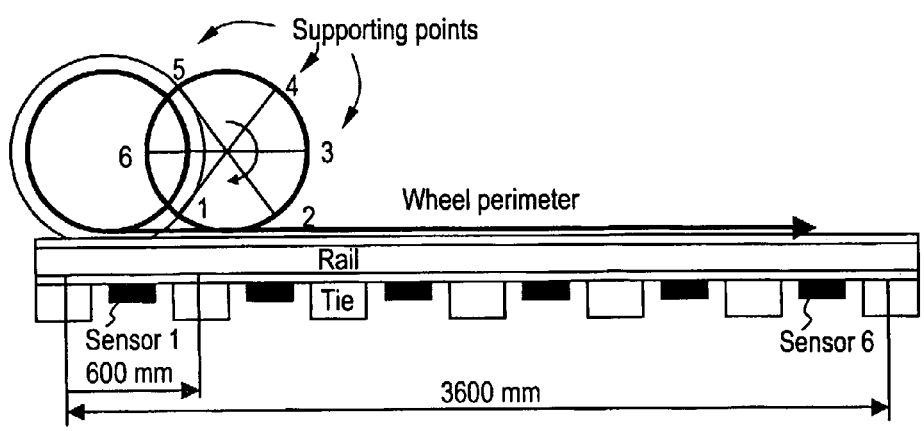
FIG. 6 illustrates a relationship of sensor spacing and wheel size.

FIG. 5 shows the idealized voltage curve at the output of the measuring system and its modulation caused by wheel thread damages. FIG. 6 illustrates how an array of six sensors on each of two parallel rails can be used to scan a rail vehicle wheel having a diameter of 1145 mm. The voltage curve at the sensor, caused by the laser deflection, copies the directional-bound deformation of the rail (elastic line). Discontinuities in the voltage curve are generated in response to wheel-tread degradation, for example. The response curve will be unique for each vehicle/wheel and will be dependent upon vehicle speed as well as temperature. Using appropriate calibration/compensation information, various types of useful information may be extracted from the raw signal never before thought to be obtainable. Primary data gained at the sensor in form of voltage level series can directly be processed in the software without further filtration.

The term "processing module" may include a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The processing module may have operationally coupled thereto, or integrated therewith, a memory device. The memory device may be a single memory device or a plurality of memory devices. Such a memory device may be a read-only memory, random access memory, volatile memory, non-volatile memory, static memory, dynamic memory, flash memory, and/or any device that stores digital information. A computer, as used herein, is a device that comprises at least one processing module.

As will be appreciated by one of skill in the art, embodiments of the present invention may be embodied as a device, method, or system comprising a processing module, and/or computer program product comprising at least one program code module. Accordingly, the present invention may take the form of an entirely hardware embodiment or an embodiment combining software and hardware aspects. Furthermore, the present invention may include a computer program product on a computer-usable storage medium having computer-usable program code means embodied in the medium. Any suitable computer readable medium may be utilized including hard disks, CD-ROMs, DVDs, optical storage devices, or magnetic storage devices.

The computer-usable or computer-readable medium may be or include, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM), a CD ROM, a DVD (digital video disk), or other electronic storage medium. Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of certain embodiments of the present invention may be written in an object oriented and/or conventional procedural programming languages including, but not limited to, Java, Smalltalk, Perl, Python, Ruby, Lisp, PHP, "C", FORTRAN, or C++. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Certain embodiments of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program code modules. These program code modules may be provided to a processing module of a general purpose computer, special purpose computer, embedded processor or other programmable data processing apparatus to produce a machine, such that the program code modules, which execute via the processing module of the computer or other programmable data processing apparatus, create means for implementing the functions specified in the flowchart and/or block diagram block or blocks.

These computer program code modules may also be stored in a computer-readable memory that can direct a computer or other programmable data processing apparatus to function in a particular manner, such that the program code modules stored in the computer-readable memory produce an article of manufacture.

The computer program code modules may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

FIGS. 19a-d provides exemplary flow diagrams for the acquisition of measuring data, the pre-processing of the raw data, the evaluation of the signals, the storage of information, and statistical analyses that may be used on one embodiment of a rail sensing system. Some embodiments of the subject invention are directed to one step or combination of steps set forth in the flow diagrams of FIGS. 19-a-d.

DEFINITIONS

The following are a list of definitions of some terms used in this specification:

The term "non-wheel defect" as used herein refers to a defect that exists on a part of a rail vehicle except for a wheel, and which imparts a force onto a rail through a wheel.

The term "rail vehicle" is used herein to generally refer to any vehicle comprising wheels that designed for travel along a railway, including, but not limited to, rail cars and locomotives.

The term "correlative" as used in the context of comparing signal signatures refers to signal signatures obtained under similar conditions and that have a correlation coefficient of between 0.5 to 1.0. In a more specific embodiment, signal signatures correlative to each other have a correlation coefficient of between 0.7 to 1.0. Similar conditions include, but are not limited to, one or more of the following variables: temperature, load weight, rail strength, laser sensor number and positioning, and signal processing, or manipulation of signal signature to normalize one or more of these variables. Signal signatures may also be correlative based on one or more assigned values or scores for certain criteria or feature(s) of a signal signature that fall within a predetermined range.

The term "predetermined wheel defect signal signature" as used herein refers to a wheel signal signature that is observed from a known wheel defect of a rail vehicle passing one or more laser sensors mounted to at least one rail. Predetermined wheel defect signal signatures may be determined through one or numerous repetitions of a known wheel defect passing one or more laser sensors, and in such case of numerous repetitions, averaging the signal signatures to obtain a mean signal signature, or to obtain range thresholds of such signature. Known wheel defects may include, but are not limited to, flat spots, eccentricities, wheel shelling, radial runout, tread build-up and undesired wheel shapes.

The term "predetermined non-wheel defect signal signature" as used herein refers to a wheel signal signature that is observed from a known non-wheel defect of a rail vehicle passing one or more laser sensors mounted to at least one rail. Predetermined non-wheel defect signal signatures may be determined through one or numerous repetitions of a known non-wheel defect passing one or more laser sensors, and in such case of numerous repetitions, averaging the signal signatures to obtain a mean signal signature, or to obtain range thresholds of such signature.

The term "signal stream" as used herein refers to series of signal data generated by one or more laser sensors.

The term "crib" as used herein refers to the space between consecutive railroad ties.

The term "vertical laser sensor" as used herein refers to a laser sensor that is mounted to a rail in such a fashion as to sense vertical deflection of such rail.

The term "lateral laser sensor" as used herein refers to a laser sensor that is mounted to a rail in such a fashion as to sense horizontal deflection of such rail. In a specific embodiment, lateral laser sensors are oriented to a rail such that they are rotated ninety degrees respective to vertical laser sensors.

The term "normal lateral forces" are those forces imparted laterally from a wheel to a rail at times when a rail vehicle is functioning properly.

Wheel Analysis

Figure 7:
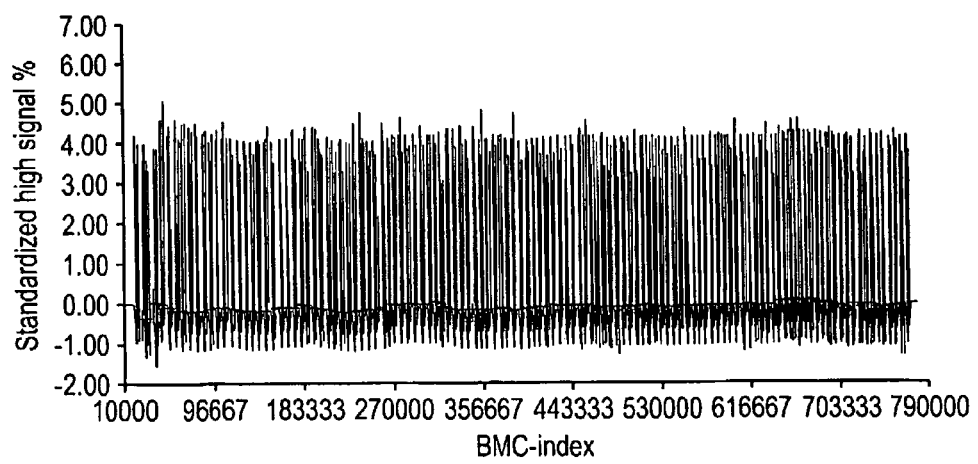
FIGS. 7-18 illustrate exemplary signals from one embodiment of a rail sensing system.
Figure 8:
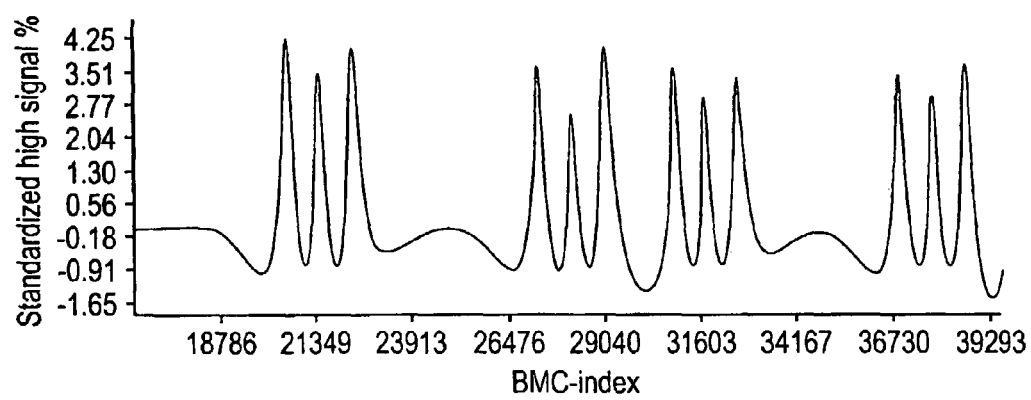
Figure 9:
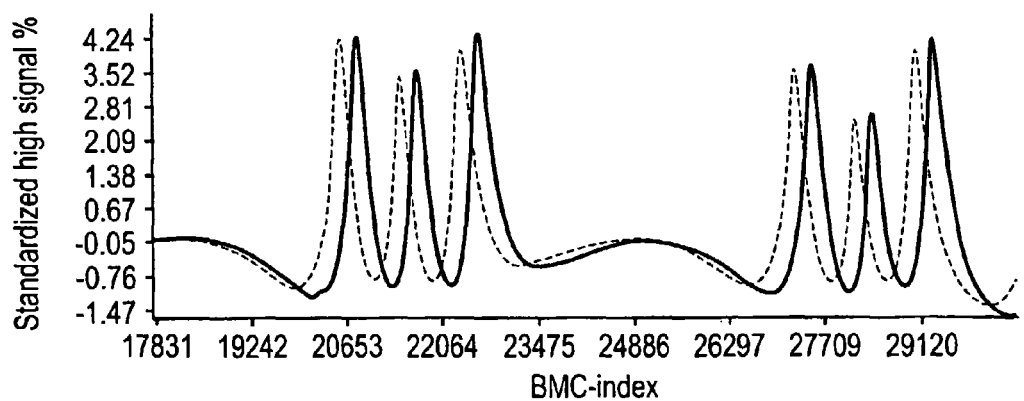
Figure 10A:
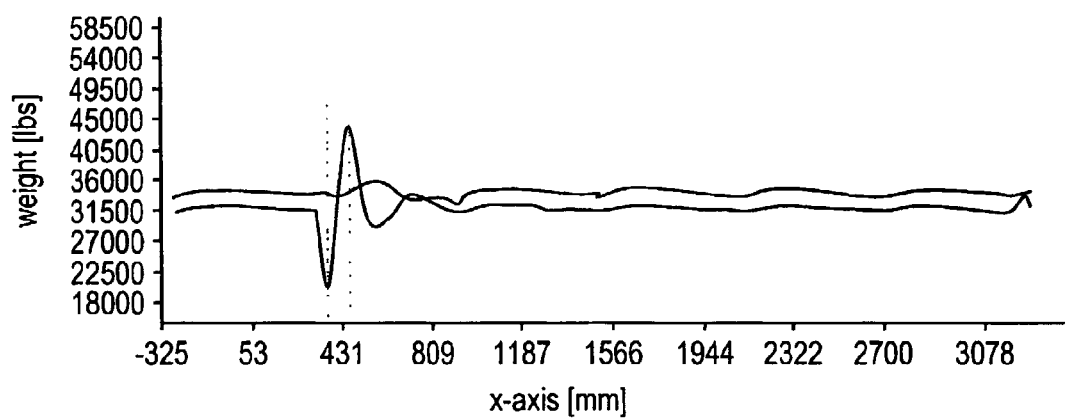
Figure 10B:
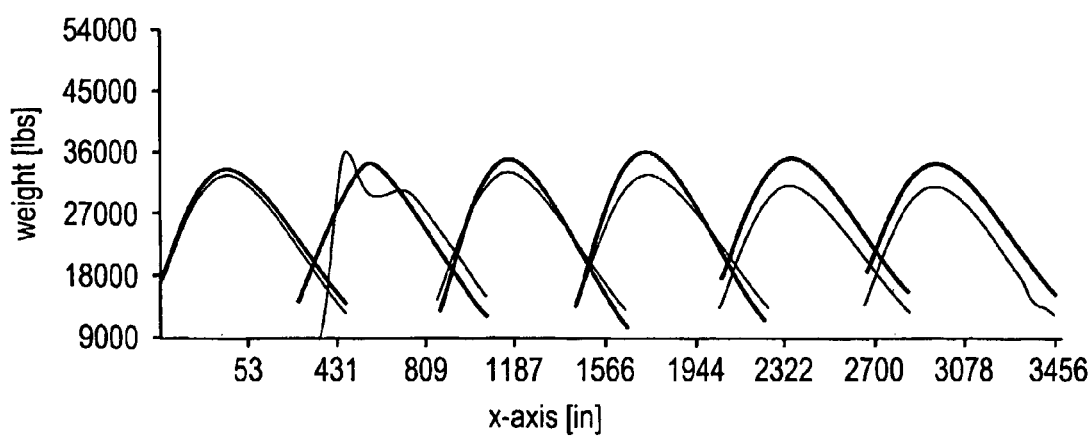

FIGS. 7-18 illustrate exemplary signals obtained from one embodiment of a rail sensing system. FIG. 7 shows a signal sample from a single laser sensor sensing a complete train. FIG. 8 shows a signal set from a single sensor sensing two passing locomotives. FIG. 9 shows a signal set from two adjacent sensors sensing two passing locomotives. The y axis is vertical force and x axis is the circumference of the wheel.

Figure 11A:
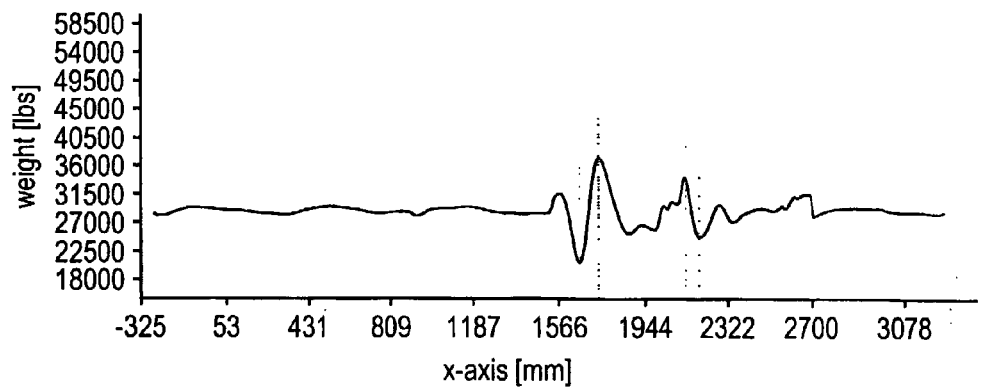
Figure 11B:
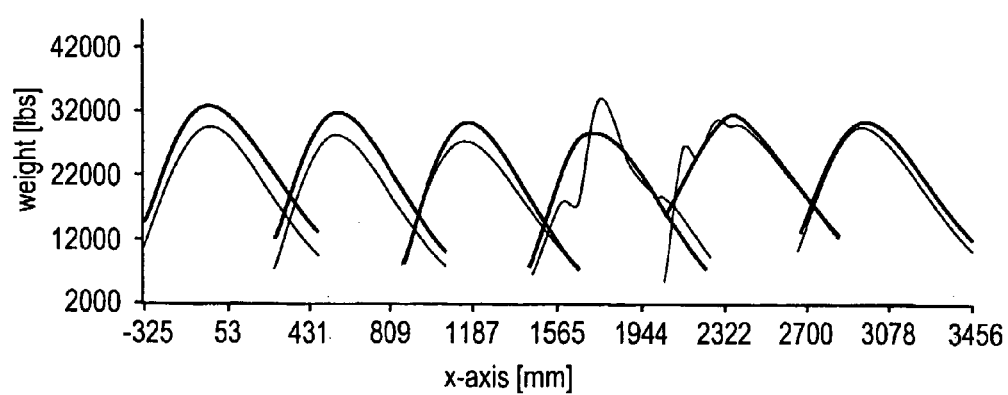
Figure 12:
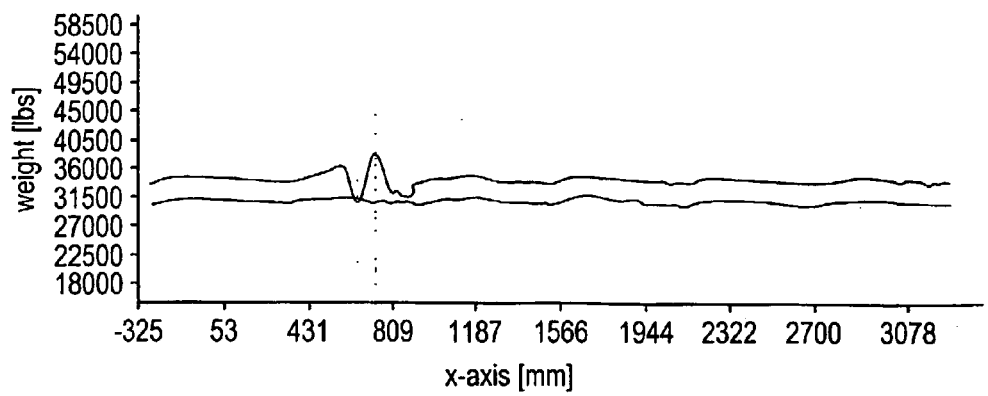
Figure 13A:
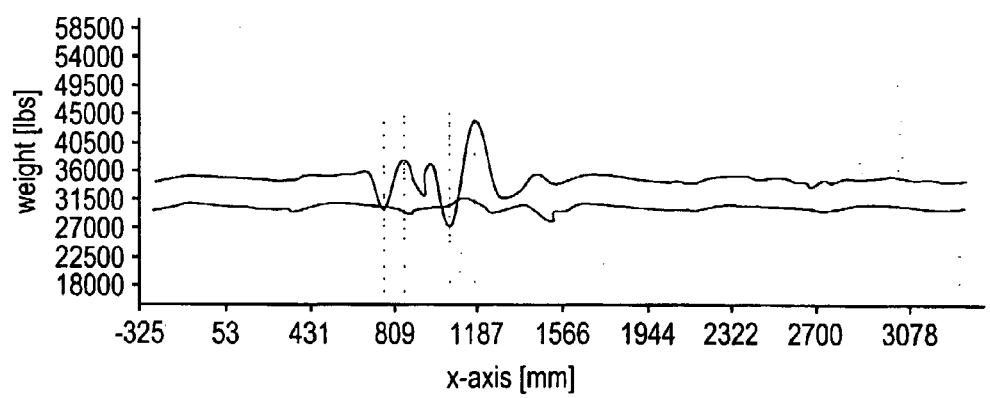
Figure 13B:

FIGS. 10-13 illustrate exemplary signals obtained from an array of vertical sensors, such as that shown in FIG. 6, and use thereof for identifying wheel flat spots. FIG. 10a shows exemplary signals produced by a wheel flat spot as shown in FIG. 10b. In a related embodiment, signal sets demonstrating a wheel flat spot signature may be compared to signals produced by a wheel known to be condemnable under Association of American Railroads (AAR), Federal Railroad Administration (FRA) or Transport Canada wheel specifications. Standards of similarity to such specifications will allow for the quick and accurate identification of condemnable wheels. FIG. 11 shows exemplary signals produced by a wheel comprising two flat spots. FIG. 12 shows exemplary signals produced by a wheel comprising a single 62 mm flat spot. FIG. 13 shows another signal set showing two adjoining flat spots of 2 and 3.5 inches, respectively.

Figure 14A:
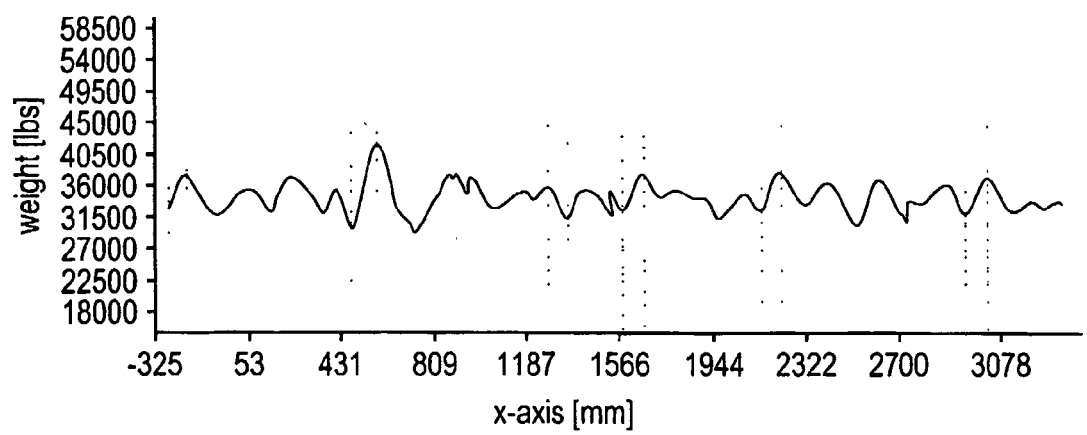
Figure 14B:
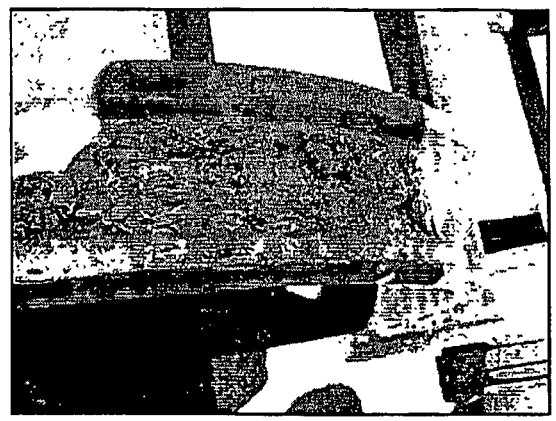
Figure 15A:
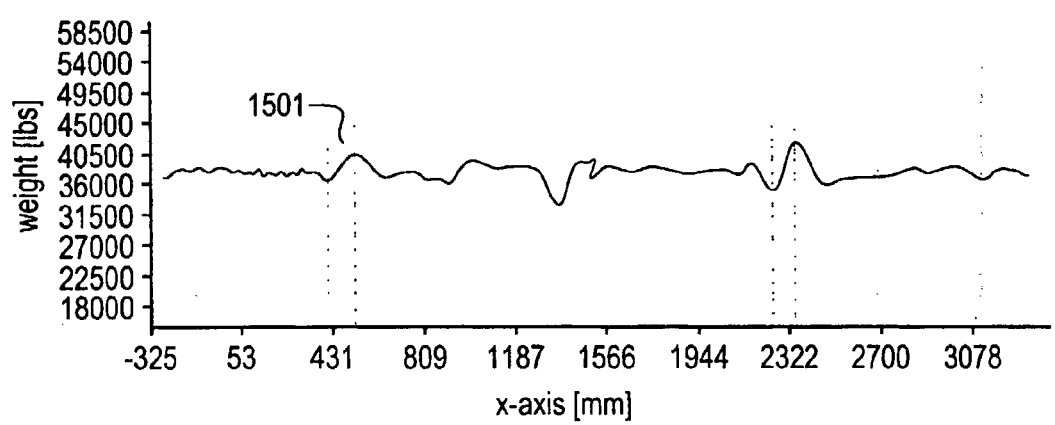
Figure 15B:
Figure 16:
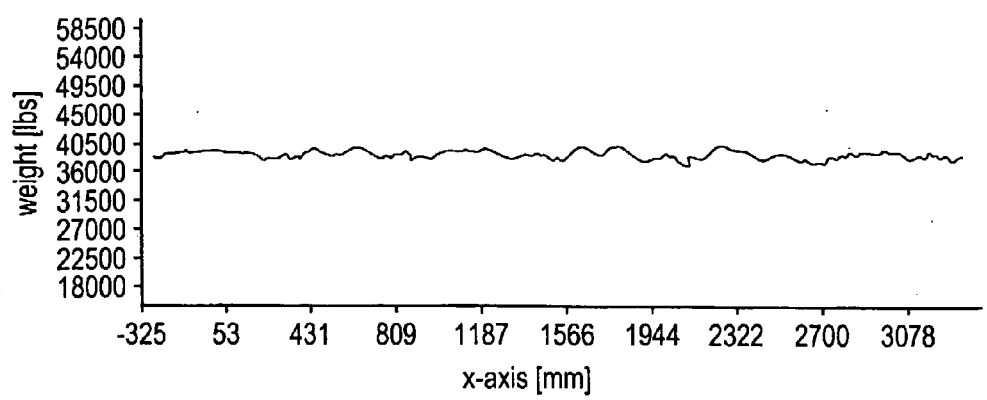

FIGS. 14-16 illustrate exemplary signals produced by wheel experiencing wheel shelling. FIG. 14a shows a signal set from a wheel exhibiting wheel shelling as shown FIG. 14b. Wheel shelling (or spalling) is caused by heavy loads that cause fatigue failure of the tread. When the shell or spall is ¾ inch in diameter or larger and shells or spalls are more or less continuous around the periphery of the wheel or whenever any shell or spall is 1 inch or more in diameter, the wheel must be removed from service. FIG. 16 shows a signal set produced by a wheel experiencing early stages of wheel shelling. A wheel is condemnable whenever the tread has built up metal ⅛ inch or higher than the wheel tread. This is caused by metal attaching itself to the wheel. Tread build up is conventionally determined by visual inspection with a steel wheel gauge. FIG. 15a shows a signal set produced by wheel experiencing tread build up as shown in FIG. 15b, see 1501. Wheels experiencing unacceptable build up levels will be readily determined by this embodiment, without the need for visual inspections. Identification of wheels having such defects are removed from service to avoid undesired rail events.

Figure 18A:
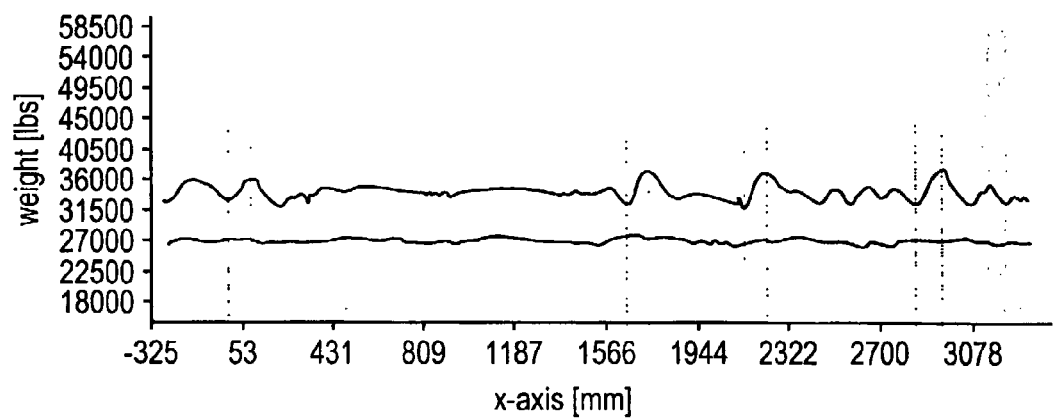
Figure 18B:
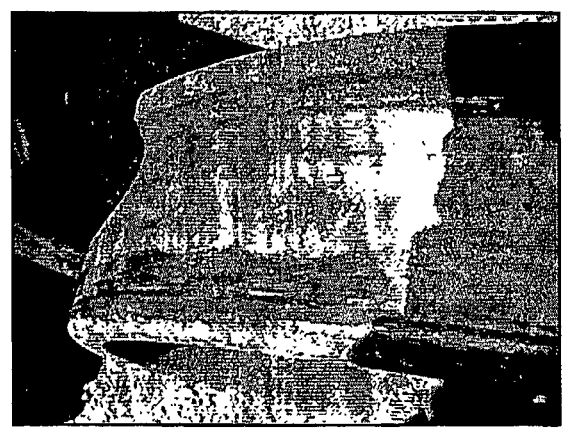
Figure 19A:
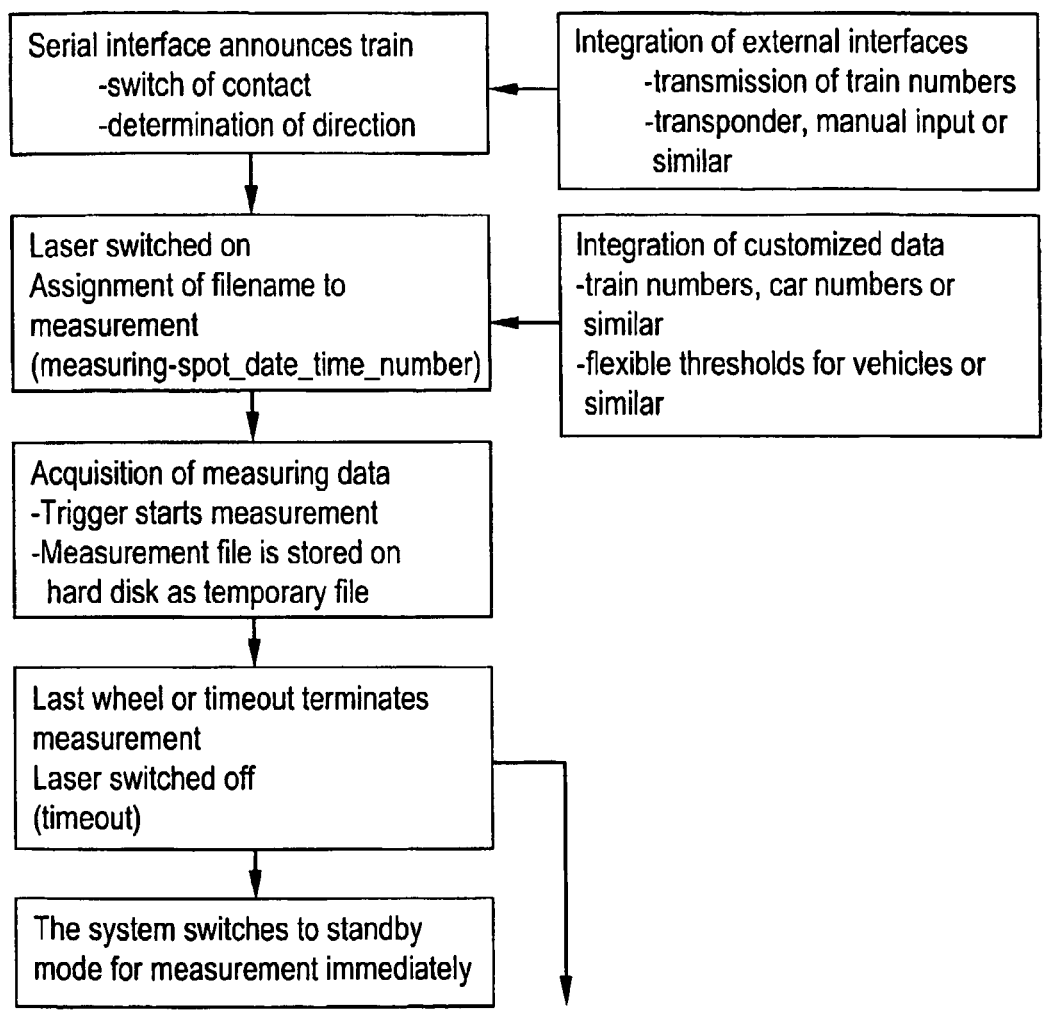
FIGS. 19a-d illustrates steps in a method of rail displacement sensing and analysis.
Figure 19A:
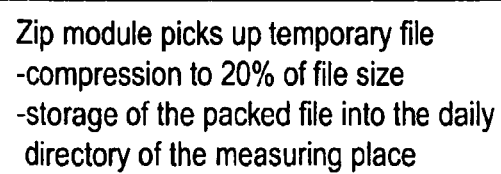
Figure 19B:
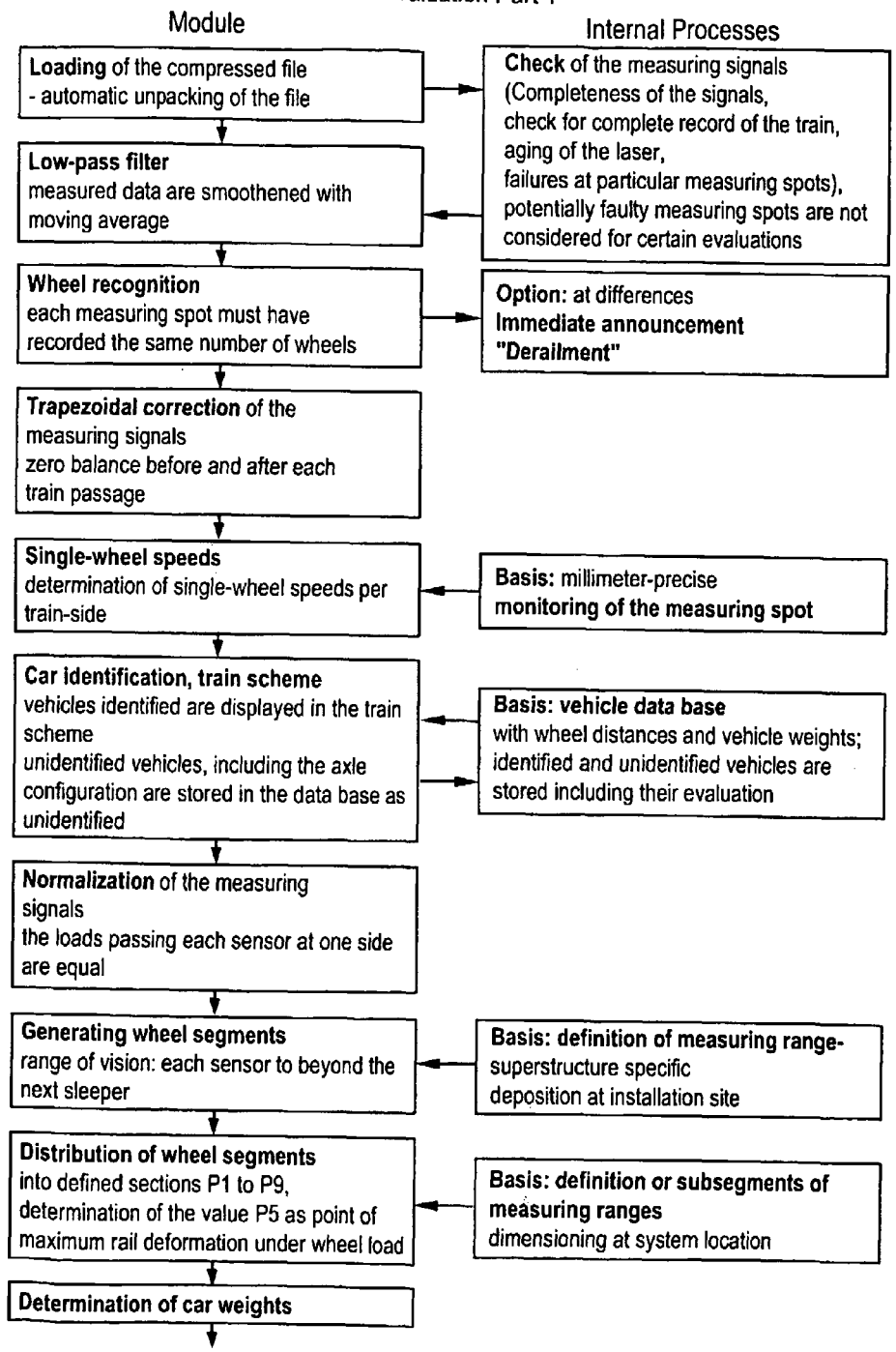
Figure 19C:
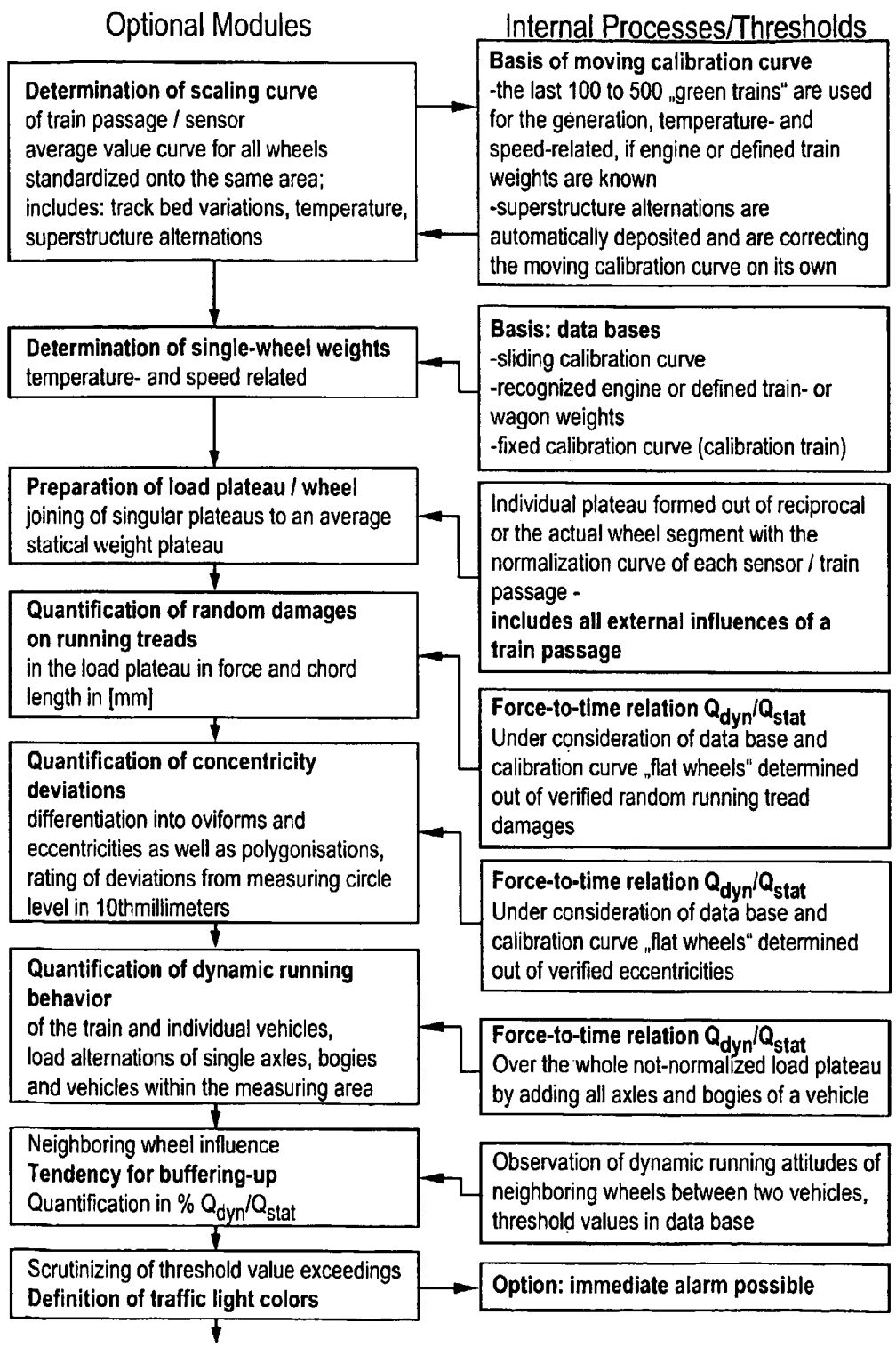
Figure 19D:
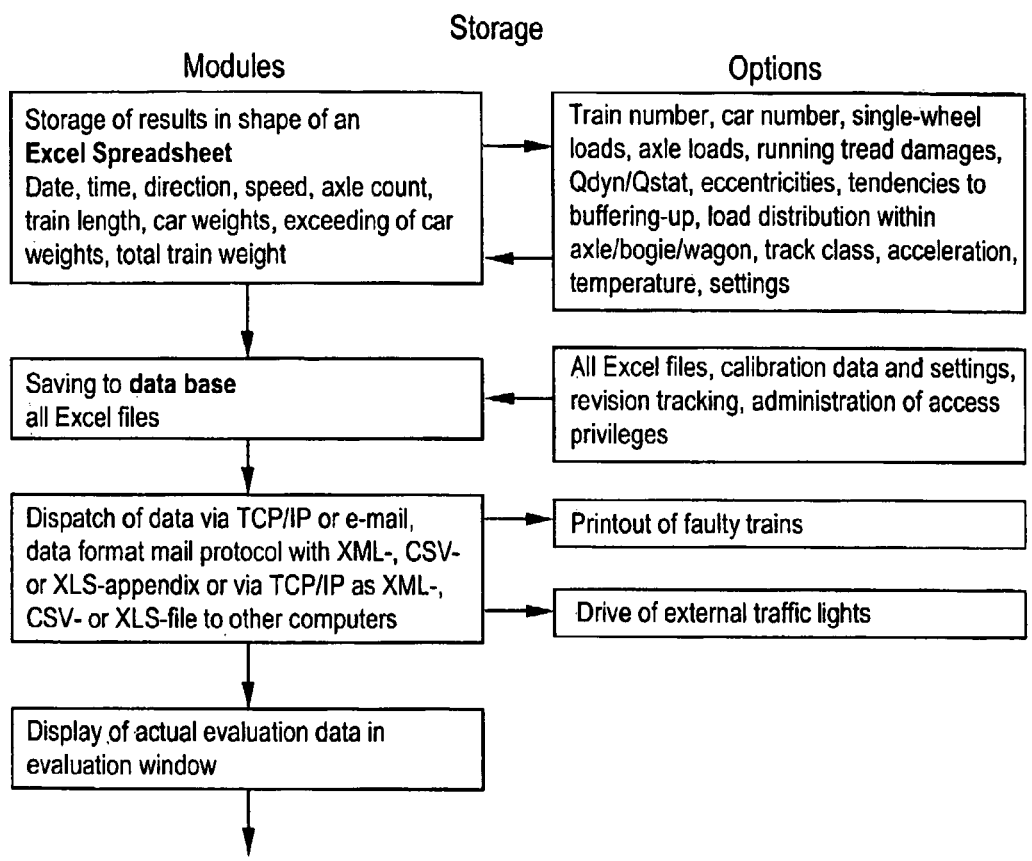
Figure 19D:
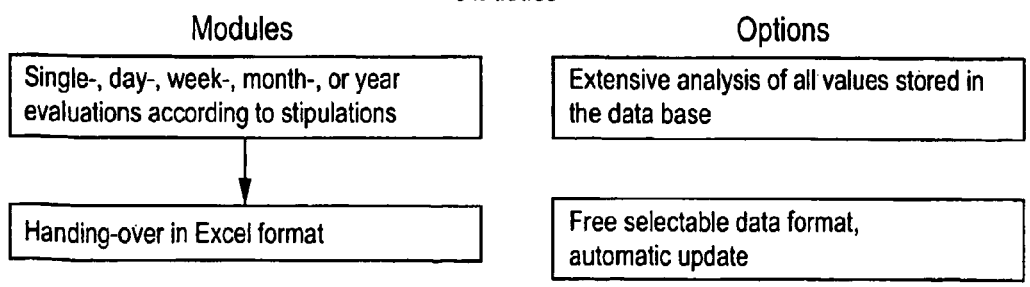

In another embodiment, an array of laser sensors is used to monitor rail wheels for identifying wheels that have an undesired shape. FIG. 18a shows a signal set obtained from a wheel having a polygon-shaped profile as shown in FIG. 18b. Signal signatures may be obtained for other shapes as well, including oval/egg shapes, plasticized wheels, and other out of round shapes. Wheels are monitored and compared to the known signal signatures for isolating problem wheels. In certain instances, wheels may deform such that they maintain a round shape but are eccentric. Multiple sensors may be implemented so as to generate oversampling creates repeat pattern needed for wheel diameter calculation. FIG. 2 shows an embodiment where six sensors are aligned along a railway between ties, i.e, crib. This array is one suitable for generating the oversampling needed. The signal generated may be processed and analyzed to determine the overall diameters/radius of a wheel in question.

The monitoring of signal sets as described above will allow for the identification of wheels that are experiencing problems or in a pre-problematic state so that they may replaced or inspected in advance of catastrophic damage or injury. Threshold values indicating a problem may be determined empirically or can be based on current industry standards.

Non-Wheel Rail Vehicle Analysis

Figure 20:
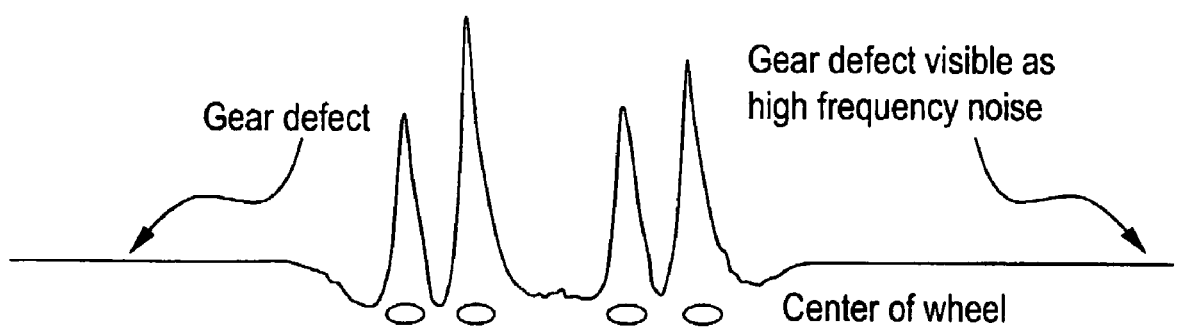
FIG. 20 shows a signal from a known gear defect.

In other embodiments, a single or multiple laser sensors are used to determine non-wheel defects such as, but not limited to, rolling stock bearing defects, truck defects (springs/bolsters), and other defects that transmit unique mechanical signatures from the rail vehicle to the rail. FIG. 20 shows a signal set from a single laser sensor. In one embodiment, the inventors have discovered that gear defects may be identified by monitoring for high frequency noise signature as that shown in FIG. 20, see 2001. In a specific embodiment, the low frequency signal is equalized before monitoring for high frequency noise signatures. The rail vehicle may in turn be identified, inspected, replaced and or fixed. In other embodiments, the signal signatures of known defects are determined and then used to monitor for and identify defects so that they may also be addressed.

Figure 17A:
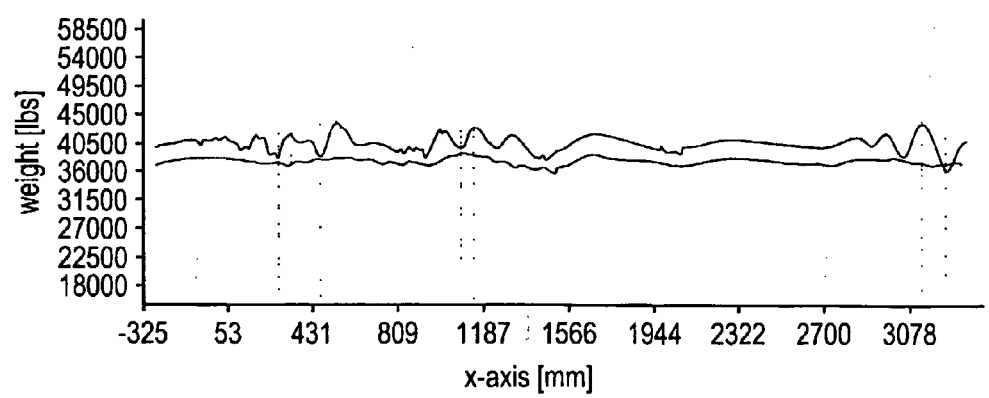
Figure 17B:
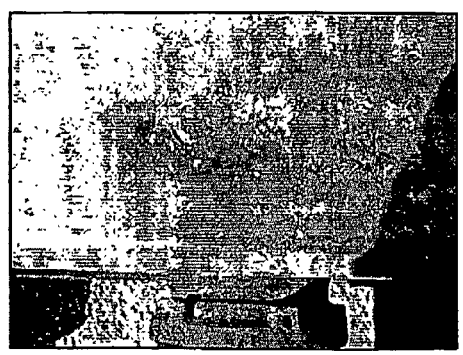

In a further embodiment, signal sets from an array of laser sensors exhibiting a signature indicative of a defective bearing is compared with infrared data obtained from the rail vehicle inboard and/or outboard axle bearing; traction motor bearings; wheels and/or gearboxes; such that the redundancy of data will allow for more accurate determinations of defects. FIG. 17 shows a signal set from a rail car or locomotive that has a defective bearing. In one test set-up, a pattern indicative of a degraded bearing was detected for a rail vehicle. Hot box detector data for that vehicle was then checked, and it confirmed that the exact bearing identified by the rail detection system was, in fact, warming up.

Single or multiple laser sensors may also be used to determine high-force resonant or oscillating truck set conditions, such as, but not limited to, truck hunting and binding trucks. In a specific embodiment, the signal signatures of known truck problems are obtained from lateral sensors, and in turn used to monitor for and identify truck problems of rail vehicles.

Rail Analysis and Rail Impact Analysis

Figure 21:
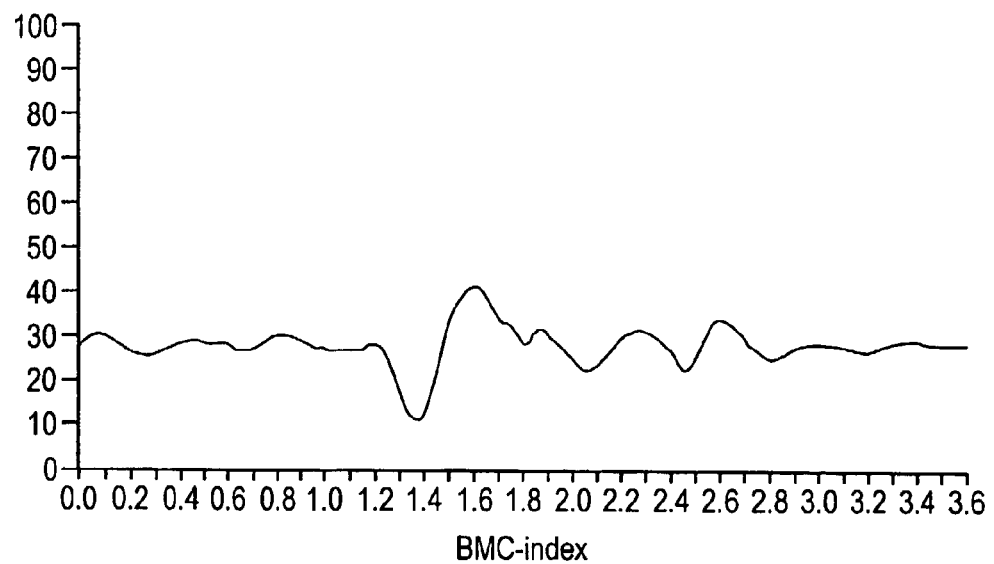
FIGS. 21-22 show signal curves used to determine static and dynamic energy forces between a rail vehicle and the rail.
Figure 22:
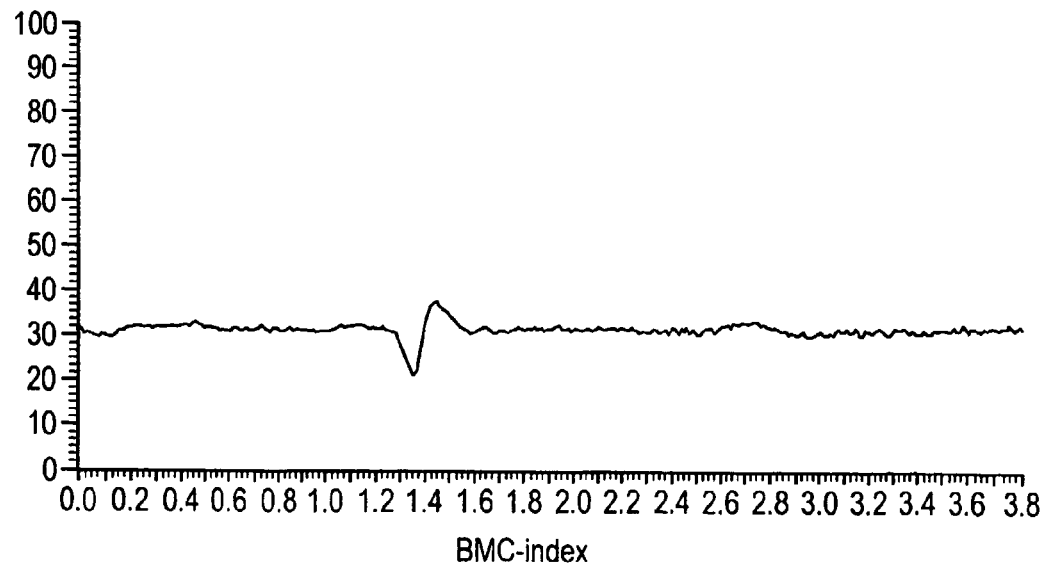

According to a further embodiment, a single or multiple laser sensors are used to determine static and dynamic energy forces between a rail vehicle and the rail. FIGS. 21 and 22 show graphs of the kinetic energy applied onto a rail by a passing train that is obtained through processing signals from laser sensors. In a related embodiment, single or multiple laser sensors are implemented to determine resonant impact conditions, as a function of the kinetic energy measurement that may lead to undesired rail breakage. Vertical and/or lateral sensors may be used to obtain this signal data for further processing and analysis for determining correlation to undesired stresses on rail(s).

Figure 23:
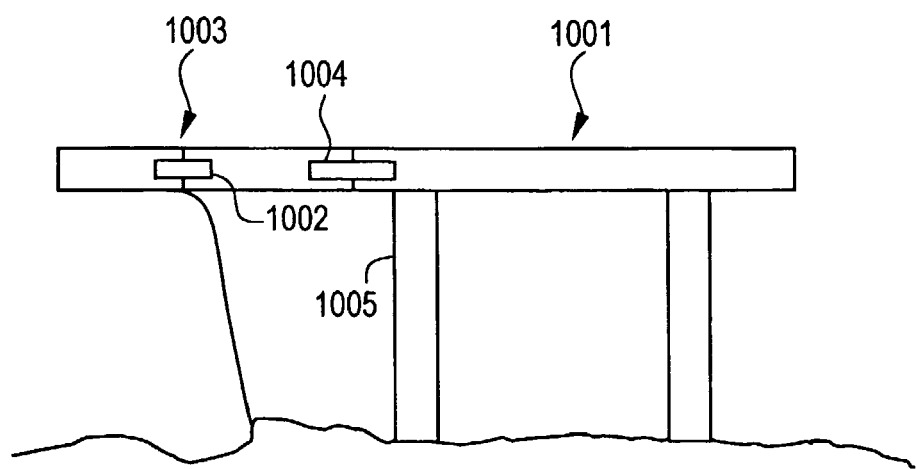
FIG. 23 shows a schematic for a system for detecting misalignment occurring at a static bridge.
Figure 24:
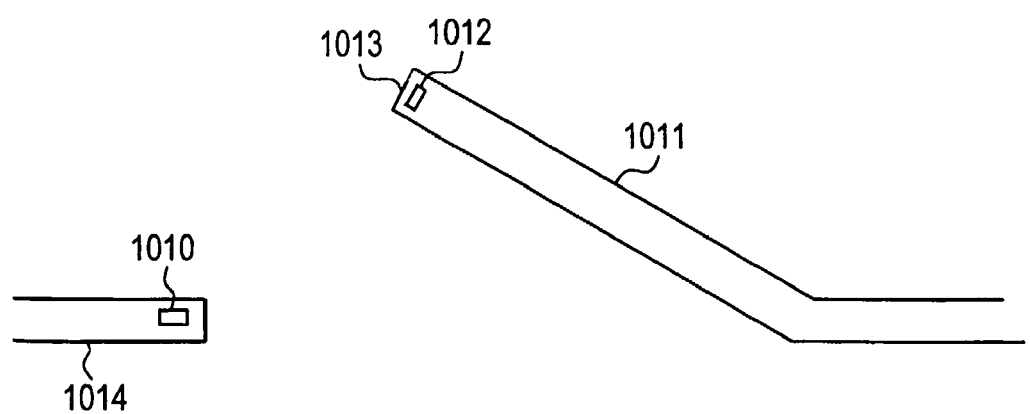
FIG. 24 shows a schematic for a system for detecting misalignment occurring at a moving bridge.
Figure 25:
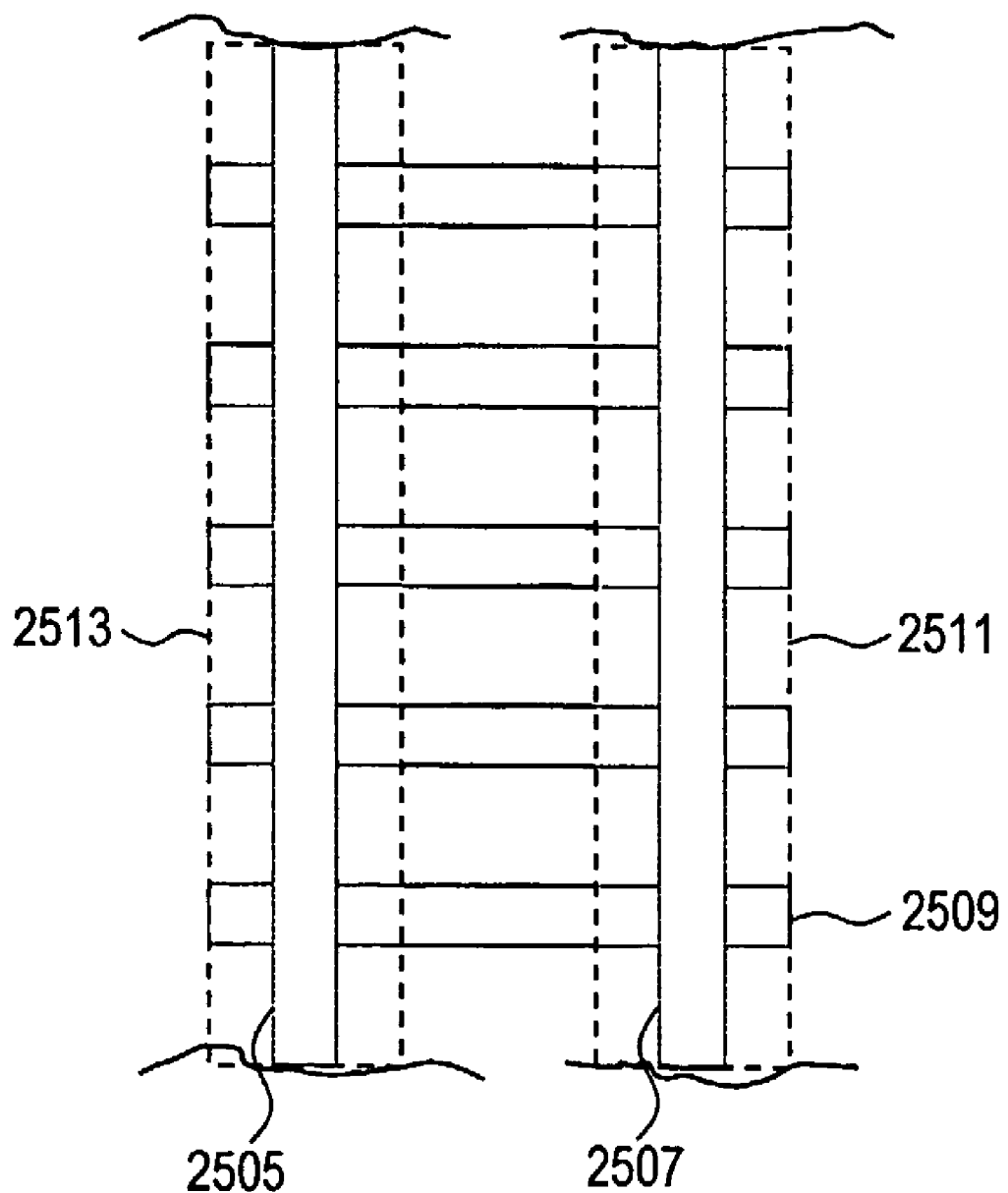
FIG. 25 shows a section of a bridge schematic illustrating exemplary bridge components upon which laser sensors may be positioned to sense bridge deflection and/or misalignment.

Rail alignment at bridges is an issue of critical importance. Due to the movement of bridges, especially draw bridges and swivel type bridges, or propensity of bridges to be shifted by collisions to their structures by passing boats and automobiles, there is a higher likelihood that rails at bridges become misaligned. This can lead to severe rail damage, derailments and other catastrophic consequences. In one embodiment, the inventors have developed a solution to this problem that comprises implementation of laser sensors at rail/bridge junctures. FIG. 23 shows a bridge alignment monitoring configuration for a static bridge 1001 wherein a first sensor 1002 is placed at the rail/bridge juncture 1003, where the rail approach aligns with the bridge span interface, and a second sensor 1004 is placed on the bridge 1001 near a support structure 1005. In other embodiments, one or more sensors are positioned at multiple locations along the bridge dependent on bridge length, including on both left and right rails, as determinable by one skilled in the art when equipped with the teachings herein. Furthermore, sensors may be positioned on vertical and/or horizontal axes of bridge timbers (2509, FIG. 25) upon which railroad running rails are secured (2505, 2507, FIG. 25). The bridge timbers 2509 are supported by girders (2511, 2513, FIG. 25) and fastened to the girders 2511, 2513 by hook bolts. The girders may in turn be supported by a truss (see http://pghbridges.com/bridges). Sensors may be positioned along these other components in order to detect shifts in the support structure of the rail that do not necessarily affect rail alignment. In another embodiment, a laser sensor is modified such that the laser component is placed at a bridge approach and the detector component is placed at bridge span, or vice versa. The laser is actuated at scheduled time intervals. The signal is collected and evaluated by a computer with a processing module and a computer-readable program code module for causing the computer to determine deviation of the alignment signal from a predetermined norm. In the event of misalignment, an alarm signal is generated notifying the user of a potential problem. Laser sensors may comprise a housing to prevent exposure of the laser and detector to environmental conditions. FIG. 24 shows a bridge monitoring alignment configuration for a moving bridge span 1011, wherein the laser sensor is modified so that the laser 1010 and detector 1012 are not rigidly engaged to one another and are separable at the bridge span interface 1013 and bridge approach 1014. Upon closure of the moving bridge 1011, the laser 1010 and detector 1012 are actuated to determine correct realignment of a bridge 1011.

Car/Locomotive Tracking and Management

The determination of the presence and location of a rail vehicle is conventionally performed via the use of the electromagnetic type sensors. Such sensors require movement of a rail vehicle in order to create a reliable signal. In the railway environment, electromagnetic radiation is often generated that may obscure signals from electromagnetic sensors. Furthermore, at zero velocity electromagnetic sensors cannot detect a rail vehicle. At slow velocities, electromagnetic sensors have difficulty detecting rail vehicles, especially in the presence of electromagnetic noise. Knowing on which track and where a rail vehicle is positioned is of critical importance. The implementation of laser sensor(s) avoids these issues, as the laser sensors are not affected by electromagnetic radiation (noise immune) and can detect a rail vehicle at zero velocity.

In addition, the implementation of two or more sensors can enable one to determine not only presence and location of a rail vehicle, but also the direction the rail vehicle is moving and the velocity of the rail vehicle. In an alternative embodiment, a single laser sensor is implemented to determine wheel velocity by analyzing the velocity between the waveform inflections of the signal stream as the wheel passes.

In an additional embodiment, multiple laser sensors are implemented in the yard sorting process. In regards to the disconnection, sorting, and classification of rails, the inventors have discovered that sensing where in the yard rail vehicles are, as well as discerning the load of rail vehicles, will be of great benefit in the yard process. Railroads use hump yards to marshal trains. The hump yard basically provides a switch point where a car can be attached to one of many trains. A string of cars is pushed up an incline by a switcher locomotive. When the car reaches the crest of the incline or hump, the car is released from the string and rolls down the hump to pick up speed. Part way down the hill or hump, the car will encounter a retarding device that will slow the car to the proper speed. The ideal speed represents just enough energy to cause the couplers of the mating cars to engage, but no more. The car will also encounter a series of switches to direct the car to the appropriate train. Any excess speed or energy as the car couples to the train will be transferred to the car and lading. The retarding devices and the switches are generally controlled remotely from a hump yard tower.

Also, in the hump or other yards, the locomotive may be controlled from a remote location by an operator on the ground. The remote control locomotive (RCL) systems usually include an RCL device carried by the operator. The location of the RCL operator is important to the management of the yard, as well as the control signals that are sent to the locomotive. From the ground perspective, the RCL operator does not always have an appropriate perspective of the total layout of the yard, much less the total train. Also, since he is not on the train, he cannot sense the forces in the train by the seat of his pants, as most well-trained over the road operators can.

As vehicles roll through the ladder to the classification bowl, the vehicles are typically pushed by gravity down the incline. Therefore, speeds and momentums are affected by the load weight and will influence speed and management of the vehicles. Laser sensors are implemented at strategic locations to monitor positioning of rail vehicles and to obtain vehicle weights. Further, knowing the weight not only assists in determining what the speed of the vehicle will be as it moves through the yard, but will also assist in verifying and tracking load contents. Since rail vehicles travel only on tracks, and specific tracks in railyards have specific purposes, many of the tasks assigned to other vehicles involve predictable vehicle movements on the specific tracks. Therefore, knowing a vehicle location at any time provides information on the status of all tasks involving the vehicle. For example, knowing that a vehicle is presently at a specific point on a specific track indicates the function or operation of the vehicle is in the process of performing, the functions or operations of the vehicle has completed, and the approximate timeliness of future functions or operations. Accordingly, the use of the laser sensors, which can sense moving or non-moving rail vehicles, as described herein, will enable one to optimize and prioritize movement vehicles throughout the yard. Sensors can be placed as desired at points of route changes or in straight track at intervals necessary for traffic space. In a specific embodiment, systems and methods as that taught in U.S. Pat. No. 6,377,877 (incorporated herein by reference) are improved by implementing laser deflection sensors along rails in the hump yard.

Single or multiple laser sensors may be used as the primary data source used in rail vehicle reporting stations. Such stations are distributed throughout switching yards and report cars may be used for car inventory tracking. Report cars will send a signal, (wired, optical or wireless) as they pass the reporting station.

Single or multiple laser sensors may be used to detect unbalanced loads in a rail vehicle. Such a system can be used to weigh a rail vehicle while it is in motion. Single or multiple laser sensors may also be used for switch point locking based on wheel sensing.

Acquisition and Evaluation of Test Signal Samples

FIGS. 19*a-d* provides exemplary flow diagrams for one embodiment of the acquisition of measuring data, the pre-processing of the raw data, the evaluation of the signals, the storage of information, and statistical analyses that may be used on one embodiment of a rail sensing system.

According to one embodiment, the subject invention is directed to a method for identifying a rail vehicle wheel defect comprising obtaining a test signal sample produced by a rail vehicle passing at least one vertical laser sensor mounted to a rail; and determining whether said test signal sample comprises a signal signature correlative to a predetermined wheel defect signal signature. In a specific embodiment, such method further comprises the step of processing said test signal sample, such as normalizing the signal. In another specific embodiment of such method, the test signal sample is obtained from an array of six vertical laser sensors mounted successively to said rail.

According to another embodiment, the subject invention is directed to a method for identifying a rail vehicle non-wheel defect comprising obtaining a test signal sample produced by a rail vehicle passing at least one vertical laser sensor mounted to a rail; and determining whether the test signal sample comprises a signal signature correlative to a predetermined non-wheel defect signal signature.

In yet a further embodiment, the subject invention is directed to a method of determining the velocity of a rail vehicle comprising obtaining a signal sample from at least one vertical laser sensor mounted to a rail, wherein the signal sample comprises a waveform pattern; and measuring time between points on successive waveform inflections.

An additional embodiment of the subject invention pertains to a system for producing a signal stream indicative of vertical impact forces on a railway for processing and evaluation comprising a first array of six vertical laser sensors mounted to a rail at consecutive rail sections spanning at least six consecutive cribs; a power source for the first array of six vertical laser sensors; at least one wheel sensor mounted to the rail upstream from the first array to actuate the power source upon passing of a rail vehicle over the at least one wheel sensor; and a computer communicatingly connected to the array, the computer comprising at least one processing module and a computer-readable program code module for causing the computer to process signals generated by the array of six vertical laser sensors. The system may further comprise at least one lateral laser sensor mounted to the rail upstream or downstream, or both, to the first array; or the system may further comprise a second array of six vertical laser sensors mounted to an opposing rail at corresponding consecutive rail sections; or the system may further comprise at least one lateral laser sensor mounted to said opposing rail upstream or downstream, or both, to said second array; or the system may further comprise a second array of six vertical laser sensors mounted to an opposing rail at corresponding consecutive rail sections; at least one lateral laser sensor mounted to said opposing rail upstream or downstream, or both, to said second array; and at least one wheel sensor mounted to said opposing rail upstream from said second array of six vertical laser sensors; or combinations thereof.

In a specific embodiment, the subject invention is directed to a system for producing a signal stream indicative of vertical and lateral impact forces on a railway for processing and evaluation comprising a first array of six vertical laser sensors mounted to a rail at consecutive rail sections spanning at least six consecutive cribs; a second array of six vertical laser sensors mounted to an opposing rail at corresponding consecutive rail sections; a power source for the first array or the second array of six vertical laser sensors, or both; at least one wheel sensor mounted to the rail upstream from said first array to actuate said power source upon passing of a rail vehicle over said at least one wheel sensor; at least one wheel sensor mounted to the opposing rail upstream from said second array of six vertical laser sensors; at least one lateral laser sensor upstream and at least one lateral laser sensor downstream of the first array; and at least one lateral laser sensor upstream and at least one lateral laser sensor downstream of the second array.

Still in a further embodiment, the subject invention pertains to a method of identifying abnormal lateral forces applied to a rail from a rail vehicle comprising mounting at least one lateral laser sensor onto a rail; obtaining a test signal sample produced by a rail vehicle passing the lateral laser sensor; and evaluating whether the test signal sample comprises a signature indicative of lateral forces deviating from normal lateral forces. Evaluating the test signal sample may comprise evaluating whether said test sample comprises a signature correlative to a predetermined signature produced by a rail vehicle experiencing truck hunting; or evaluating whether the test sample comprises a signature correlative to a predetermined signature produced by a rail vehicle experiencing wheel binding; or evaluating whether said test signal sample comprises a signature indicative of lateral forces deviating more than ten percent from normal lateral forces.

In yet another embodiment, the subject invention is directed to a method of determining misalignment of a rail bridge comprising obtaining a test signal sample from one or more laser sensors mounted on the rail bridge; and recognizing whether said test signal sample deviates from a normal alignment signal.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The teachings all references cited herein are incorporated in their entirety to the extent not inconsistent with the teachings herein.

What is claimed is:

1. A system for producing a signal stream indicative of at least one characteristic relating to a railway, the system comprising:
    a first array of a plurality of sensors mounted to a rail at consecutive rail sections spanning a plurality of consecutive cribs;
    a power source for said first array of sensors;
    at least one wheel sensor mounted to said rail upstream from said first array and configured to actuate said power source upon passing of a rail vehicle over said at least one wheel sensor; and
    a computer communicatingly connected to said first array and configured to:
        process signals generated by said first array of sensors, the signals comprising a waveform indicative of forces applied to the rail due to the passing of the rail vehicle,
        compare the waveform to a plurality of stored waveforms to determine whether the waveform is indicative of forces applied to the rail that deviate from predetermined forces, the stored waveforms corresponding to different types of defects, the different types of defects including at least two of a wheel flat spot, an eccentricity, wheel shelling, tread build-up, or a defective bearing,
        predict a probable type of defect based on the comparison, and
        determine a severity of the probable type of defect.

2. The system of claim 1, wherein the computer is further configured to recognize a predetermined deflection of the rail based on the signals generated by the first array of sensors.

3. The system of claim 1, wherein the sensors are laser sensors configured to detect vertical deflection in the rail.

4. The system of claim 1, wherein the sensors are laser sensors configured to detect vertical and lateral deflection in the rail.

5. The system of claim 1, wherein the first array of sensors includes at least six sensors mounted at the consecutive rail sections spanning at least six of the consecutive cribs.

6. The system of claim 1, wherein the at least one wheel sensor is configured to trigger actuation of the at least one sensor.

7. The system of claim 1, wherein the at least one sensor is configured to scan a wheel of the rail vehicle to produce a voltage curve.

8. The system of claim 1, wherein the different types of defects include at least three of the wheel flat spot, the eccentricity, wheel shelling, tread build-up, or the defective bearing.

9. A method of identifying at least one characteristic relating to a rail in connection with a passing of a rail vehicle, at least one sensor being mounted to the rail and configured to detect deflection in the rail, the method comprising:
    obtaining a signal from the at least one sensor produced by a rail vehicle passing said at least one sensor, the signal comprising a waveform indicative of forces applied to the rail clue to the passing of the rail vehicle; and
    comparing the waveform to a plurality of stored waveforms to determine whether the waveform is indicative of forces applied to the rail that deviate from predetermined forces, the stored waveforms corresponding to different types of defects, the different types of defects including at least two of a wheel flat spot, an eccentricity, wheel shelling, tread build-up, or a defective bearing; and identifying a defective wheel based on the comparison.

10. The method of claim 5, wherein the at least one sensor is mounted to a rail bridge and the method further comprises:
evaluating whether said waveform deviates from a predetermined waveform related to an alignment of the rail bridge.

11. The method of claim 5, wherein the at least one sensor is a laser sensor mounted to a rail bridge and comprising:
a laser component that is positioned at one of a bridge approach or the rail bridge; and
a detector that is mounted on the other one of the bridge approach or the rail bridge.

12. The method of claim 9, wherein:
the at least one sensor is mounted to a rail bridge; and
the rail bridge is a moving bridge configured to open and close in response to a signal from the at least one sensor, without disruption of a function of the at least one sensor upon closure of said rail bridge.

13. The method of claim 9, wherein evaluating the signal includes evaluating whether the signal comprises a waveform indicative of lateral forces applied to the rail due to the passing of the rail vehicle that deviate from predetermined lateral forces by more than ten percent.

14. The method of claim 9, further comprising:
producing a voltage curve indicative of the detected deflection; and
determining discontinuities in the voltage curve to identify wheel degradation.

15. The method of claim 9, wherein the at least one sensor is zit least one laser sensor configured to detect lateral deflection in the rail.

16. The method of claim 9, further comprising:
measuring times between points on successive inflections of the waveform of the sensed signal; and
determining a velocity of the rail vehicle based on the measured times.

17. The method of claim 9, wherein the stored waveforms are determined based on at least one industry standard.

18. The method of claim 9, wherein the different types of defects include the wheel flat spot, wheel shelling, and the defective bearing.

19. The method of claim 9, further comprising predicting a probable type of defect based on the comparison.

20. The method of claim 19, further comprising determining a severity of the probable type of defect.

21. A system for producing a signal stream indicative of at least one characteristic relating to a railway, the system comprising:
a first array of a plurality of sensors mounted to a rail at consecutive rail sections spanning a plurality of consecutive cribs;
a power source for said first array of sensors;
at least one wheel sensor mounted to said rail upstream from said first array and configured to actuate said power source upon passing of a rail vehicle over said at least one wheel sensor; and
a computer communicatingly connected to said first array and configured to:
process signals generated by said first array of sensors, the signals comprising a waveform indicative of forces applied to the rail due to the passing of the rail vehicle,
compare the waveform to a plurality of stored waveforms to determine whether the waveform is indicative of forces applied to the rail that deviate from predetermined forces, the stored waveforms correspond to different types of defects, the different types of defects including at least one wheel defect and at least one non-wheel defect,
predict a probable type of defect based on the comparison, and
determine a severity of the probable type of defect.

22. The system of claim 21, wherein the at least one wheel defect includes a plurality of different undesired shapes of a wheel, the undesired shapes including at least one of a polygon, an oval, or an egg.

23. The system of claim 21, wherein the at least one non-wheel defect includes a defective bearing.

24. The system of claim 21, wherein the at least one wheel defect includes at least two of a wheel flat spot, an eccentricity, wheel shelling, tread build-up, or a defective bearing.

* * * * *